United States Patent
Sohn

(10) Patent No.: US 7,512,812 B2
(45) Date of Patent: Mar. 31, 2009

(54) METHOD OF SECURELY ERASING DATA AND HARD DISK DRIVE USING THE SAME

(75) Inventor: Hak-yeol Sohn, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 823 days.

(21) Appl. No.: 11/045,126

(22) Filed: Jan. 31, 2005

(65) Prior Publication Data
US 2005/0182951 A1    Aug. 18, 2005

(30) Foreign Application Priority Data
Feb. 18, 2004    (KR) ............. 10-2004-0010668

(51) Int. Cl.
*H04L 9/32* (2006.01)
*G06F 11/30* (2006.01)
*G06F 12/14* (2006.01)
*G06F 12/00* (2006.01)

(52) U.S. Cl. ............. 713/189; 713/190; 713/191; 713/192; 713/193; 713/194; 726/16; 726/17; 726/18; 726/19; 380/201; 380/202; 380/203

(58) Field of Classification Search .......... 713/189
See application file for complete search history.

(56) References Cited

U.S. PATENT DOCUMENTS 6,530,601 B2 * 3/2003 Greene ............. 283/57
6,847,950 B1 * 1/2005 Kamibayashi et al. ........ 705/57
6,874,139 B2 * 3/2005 Krueger et al. ............. 717/127

FOREIGN PATENT DOCUMENTS

| JP | 08-286904 | 11/1996 |
| JP | 11-003285 | 1/1999 |
| JP | 2001-035092 | 2/2001 |
| JP | 2001-142654 | 5/2001 |
| JP | 2002-007216 | 1/2002 |
| KR | 1999-0079414 | 11/1999 |
| KR | 2002-44631 | 6/2002 |

* cited by examiner

*Primary Examiner*—Longbit Chai
(74) *Attorney, Agent, or Firm*—Staas & Halsey LLP

(57) ABSTRACT

A method of and apparatus for protecting data in a data storage system. A method of securely erasing data stored in a data storage system includes: determining whether a security-erase command is received together with a random number and an encrypted random number; decrypting the encrypted random number using a security-erase algorithm and an associated key when the security-erase command is received; determining whether the decrypted random number is identical to the received random number; and executing the security-erase command when the decrypted random number is identical to the received random number, and stopping the execution of the security-erase command when the decrypted random number is not identical to the received random number.

17 Claims, 5 Drawing Sheets

METHOD OF SECURELY ERASING DATA AND HARD DISK DRIVE USING THE SAME

CROSS-REFERENCE TO RELATED APPLICATION

This application claims the priority of Korean Patent Application No. 2004-10668, filed on Feb. 18, 2004, in the Korean Intellectual Property Office, the disclosure of which is incorporated herein in by reference.

BACKGROUND OF THE INVENTION

1. Field of the Invention

The present invention relates to a method of and apparatus for protecting data in a data storage system, and more particularly, to a method of securely erasing data recorded on a storage medium while preventing data leakage, and a hard disk drive using the method.

2. Description of Related Art

A hard disk drive is a type of a data storage device that contributes to the operation of a computer system by reproducing data from a disc, or writing data on a disk using a magnetic head. Current hard disk drives are compact, have a high capacity and density, and are widely used as a data storage system.

In a conventional technique, a host system transmits security commands such as security-lock, security-unlock, and security-erase commands, together with associated passwords, to a hard disk drive. The hard disk drive determines whether the received password matches a previously stored password. If the passwords match, the hard disk drive executes the security commands. However, the password is transmitted via a bus, and may be intercepted and hacked by using a bus monitoring tool. Therefore, there is a demand for greater password security.

BRIEF SUMMARY

An aspect of the present invention provides a method of securely erasing data recorded on a storage medium while preventing password leakage on an interface bus between a host system and a hard disk drive, and a hard disk drive using the method.

According to an aspect of the present invention, there is provided a method of securely erasing data stored in a data storage system, including: determining whether a security-erase command is received together with a random number and an encrypted random number; decrypting the encrypted random number using a security-erase algorithm and an associated key when the security-erase command is received; determining whether the decrypted random number is identical to the received random number; and executing the security-erase command when the decrypted random number is identical to the received random number, and stopping the execution of the security-erase command when the decrypted random number is not identical to the received random number.

According to another aspect of the present invention, there is provided a hard disk drive including: a disk which stores in a specified region thereof a security-lock algorithm, a lock decrypting key, a security-erase algorithm, and an erase decrypting key; and a controller which reads the security-erase algorithm and the erase decrypting key from the disk and decrypts the encrypted random number when a security-erase command is received together with a random number and an encrypted random number from a host device, executes an erase command when the decrypted random number is identical to the random number, and stops the execution of the erase command when the decrypted random number is not identical to the random number.

According to another aspect of the present invention, there is provided a method of generating a security-erase command, including: determining whether a hard disk drive (HDD) security-erase request is received; receiving a random number when the HDD security-erase request is received; encrypting the input random number using a security-erase algorithm and an erase decrypting key; and transmitting a security-erase command together with the input random number and the encrypted random number.

According to another aspect of the present invention, there is provided a host device including: a memory which stores a security-lock algorithm, a lock decrypting key, a security-erase algorithm, and an erase decrypting key, the security-lock algorithm and the lock decrypting key being usable to set a security-lock process for limiting data access to a hard disk drive; a controller which generally controls the hard disk drive and performs a control process for setting the security-erase algorithm and the associated key at the time of setting the security-lock process; an input unit which receives commands and data to the host device; a display unit which displays processed data; and a host interface which transfers received commands and data between the host device and the hard disk drive.

According to other aspects of the present invention, there are provided computer-readable storage media encoded with processing instructions for causing a processor to perform the aforesaid methods.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
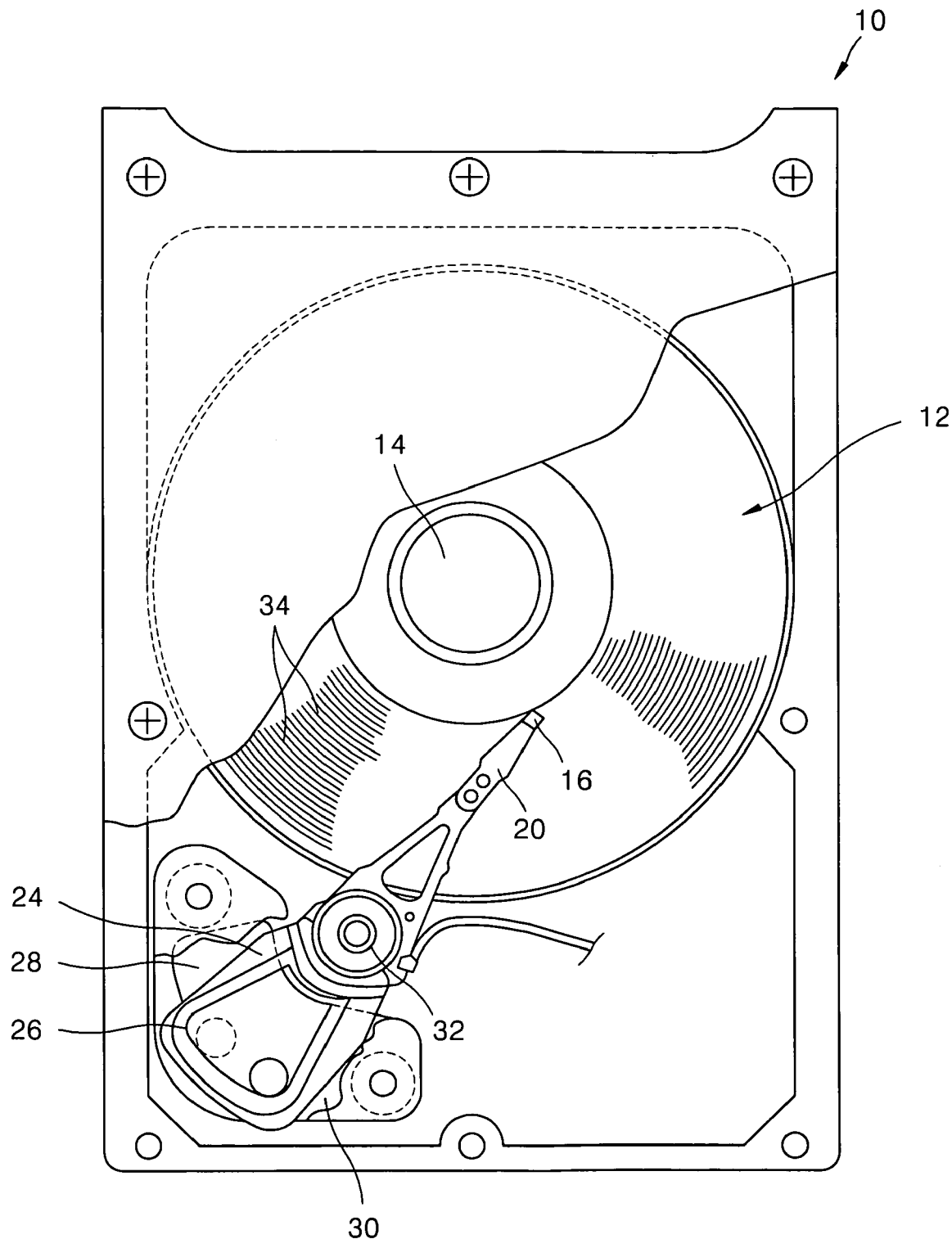
FIG. 1 is a top view illustrating a hard disk drive to which an embodiment of the present invention is applicable.

Reference will now be made in detail to an embodiment of the present invention, examples of which are illustrated in the accompanying drawings, wherein like reference numerals refer to the like elements throughout. The embodiment is described below in order to explain the present invention by referring to the figures.

FIG. 1 is a top view illustrating a hard disk drive 10 to which an embodiment of the present invention is applicable.

The hard disk drive 10 includes a spindle motor 14 and at least one magnetic disk 12 rotated by the spindle motor 14. The hard disk drive 10 also includes a transducer 16 adjacent to a disk surface of the magnetic disk 12.

The transducer 16 reads/writes information to/from the magnetic disk 12 by sensing magnetic fields of the magnetic disk 12 and the magnetizing the magnetic disk 12. Typically, the transducer 16 is coupled with the disk surface. Although a single transducer 16 is described, it is to be understood that the transducer 16 may include a read transducer for sensing the magnetic field of the magnetic disk 12 and a write transducer for magnetizing the magnetic disk 12. The read transducer is made of a magneto-resistive (MR) material. The transducer 16 is often referred to as a head.

The transducer 16 may be integrated into a slider 20. The slider 20 typically has a structure in which an air bearing is formed between the transducer 16 and the disk surface. The slider 20 is incorporated into a head gimbal assembly. The head gimbal assembly is attached to an actuator arm 24 having a voice coil 26. The voice coil 26 is adjacent to a magnetic assembly 28 constituting a voice coil motor (VCM) 30. When a current is applied to the voice coil 26, the VCM 30 generates a torque to rotate the actuator arm 24 about a bearing assembly 32. As a result of rotation of the actuator arm 24, the transducer 16 moves across the disk surface.

Typically, information is stored in annular tracks 34 on the magnetic disk 12. Each of the tracks 34 is partitioned into a plurality of sectors. Each of the sectors includes data fields and identification fields. The identification fields include gray codes used to identify the sectors and tracks (cylinders). The transducer 16 moves across the disk surface in order to read/write information to/from other tracks 34.

Figure 2:
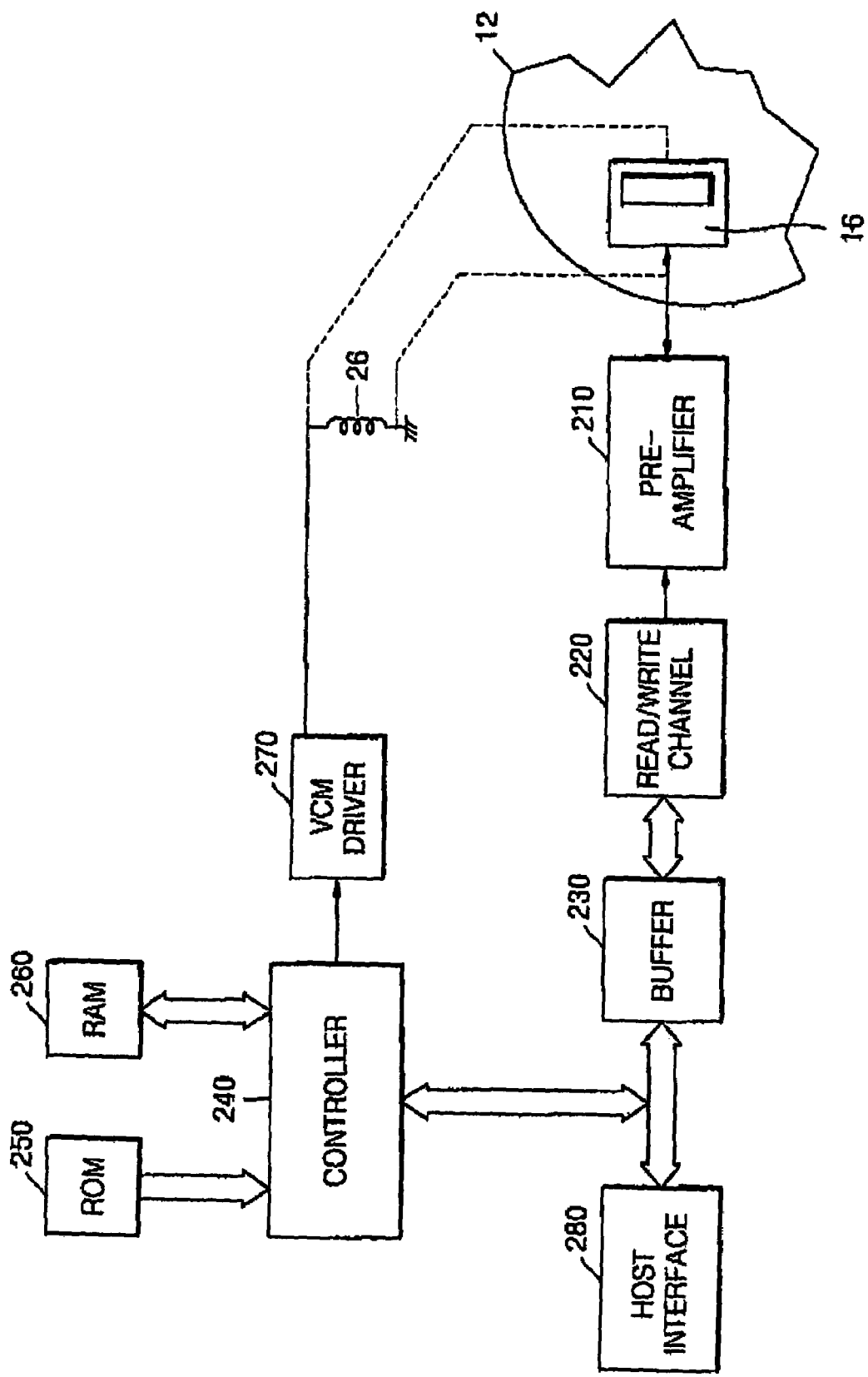
FIG. 2 is a block diagram illustrating a hard disk drive to which a secure data erasing method according to the an embodiment of the present invention is applicable.

FIG. 2 is a block diagram illustrating a hard disk drive to which a secure data erasing method according to an embodiment of the present invention is applicable.

As shown in FIG. 2, the hard disk drive 10 of FIG. 1 includes a magnetic disk 12, a transducer 16, a pre-amplifier 210, a read/write channel 220, a buffer 230, a controller 240, a ROM 250, a RAM 260, a VCM driver 270, and a host interface 280.

User data and hard disk drive operating data are stored on the magnetic disk 12. In particular, the hard disk drive operating data is stored on a maintenance cylinder region, which is a user-inaccessible region.

In addition to the hard disk drive operating data, a security-lock algorithm for limiting access to data stored on the magnetic disk 12, a lock-decrypting key associated with the security-lock algorithm, a security-erase algorithm for preventing information leakage, and an erase-decrypting key associated with the security-erase algorithm are stored on the maintenance cylinder region of the magnetic disk 12.

In addition, a master security-erase algorithm for supporting after-sale service and an associated master security-erase key are also stored on the maintenance cylinder region of the magnetic disk 12. The master security-erase algorithm and the associated key are used by a service center to securely erase data without data leakage even when the service center does not know security-lock information.

The ROM 250 stores programs and data for controlling the hard disk drive 10. When the hard disk drive 10 is booting, the hard disk drive operating data read from the maintenance cylinder region of the magnetic disk 12 is loaded onto the RAM 260.

In a write mode, data received from the host system via the host interface 280 is stored in the buffer 230. In a read mode, data read from the magnetic disk 12 is sequentially stored in the buffer 230.

The pre-amplifier 210 includes an amplifier circuit for amplifying signals sensed by the transducer 16 and a read current control circuit for applying an optimal read current to the transducer 16.

The operation of a conventional hard disk drive employing aspects of the present embodiment will now be described with concurrent reference to FIGS. 1 and 2.

In a read mode of the hard disk drive 10, the transducer 16 outputs an electric signal sensed from the magnetic disk 12. The electric signal is amplified by the pre-amplifier 210, so that the electrical signal can be easily processed. The amplified electrical signal is encoded from an analog signal into a digital signal by the read/write channel 220, so that the digital signal can be read by the host device (not shown). The digital signal is converted into a data stream and temporarily stored in the buffer 230. The data stream is transmitted to the host system though the host interface 280.

In a write mode of the hard disk drive 10, data is received from the host device thought the host interface 280 and temporarily stored in the buffer 230. The data stored in the buffer 230 is output and converted into a binary data stream suitable for writing by the read/write channel 220. The data is written onto the magnetic disk 12 by the transducer 16 using a write current amplified by the pre-amplifier 210.

In an erase mode of the hard disk drive 10, a write current is applied to the transducer 16 to write consecutive identical bits of 0 or 1 onto the data region of the magnetic disk 12, erasing the data.

The controller 240 controlling the hard disk drive 10 analyzes and executes commands received via the host interface 280.

More specifically, the controller 240 performs the following control processes: if a security-erase command is received together with a random number and an encrypted random number from the host device, controller 240 reads the security-erase algorithm and the erase decrypting key and decrypts the encrypted random number from the magnetic disk 12; if the decrypted random number is identical to the random number received together with the security-erase command, controller 240 executes an erase command; and if not, stops the execution of the erase command.

The controller 240 is also coupled to the VCM driver 270 for applying a driving current to the voice coil 26. The controller 240 applies a control signal to the VCM driver 270 in order to activate the VCM 30 and move the transducer 16.

Figure 3:
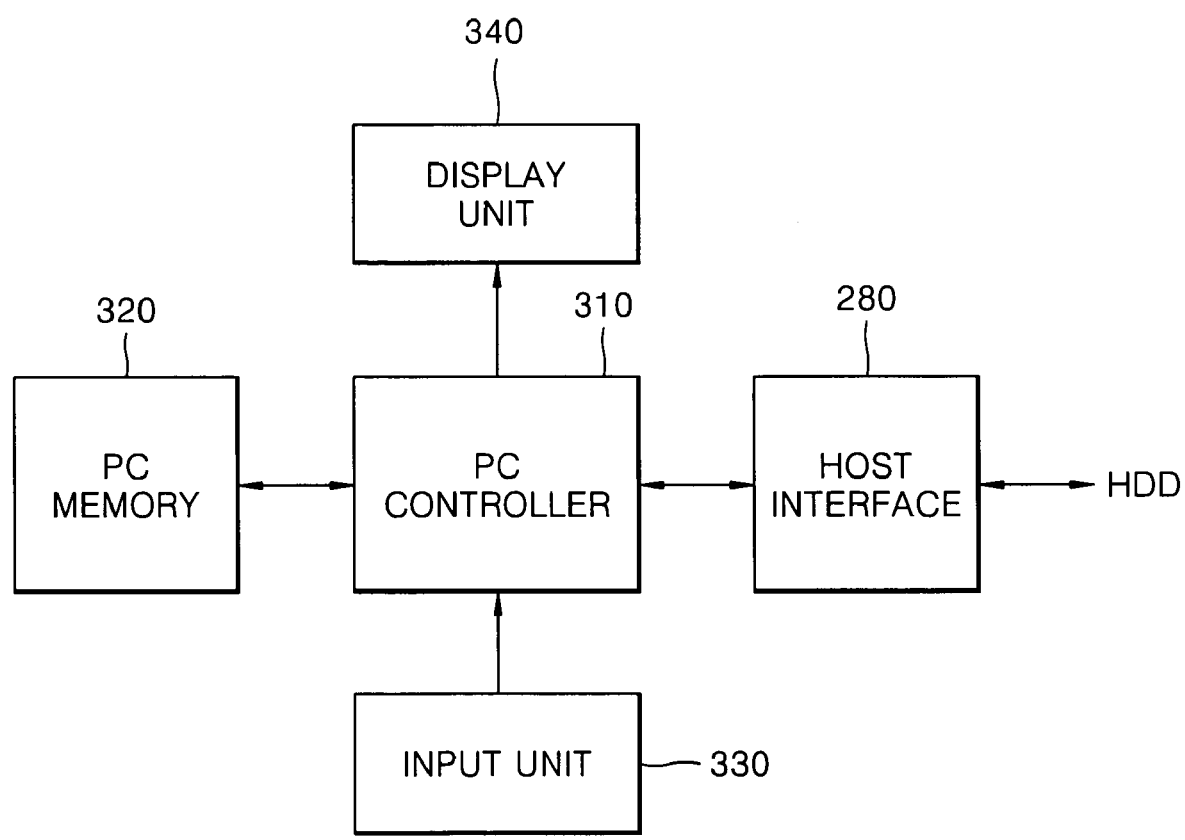
FIG. 3 is a block diagram illustrating a host device to which an embodiment of the present invention is applicable.

FIG. 3 is a block diagram illustrating a host device to which the present embodiment is applicable.

The host device includes a PC controller 310, a PC memory 320, an input unit 330, a display unit 340, and the host interface 280 described with reference to FIG. 2.

Programs and data required for operating the host device, that is, a personal computer (PC), are stored in the PC memory 320.

In particular, the PC memory 320 stores a security-lock algorithm, a lock decrypting key, a security-erase algorithm, and an erase decrypting key. Here, the security-lock algorithm and the lock decrypting key are used to set a security-lock process for limiting data access to the hard disk drive 10. In addition, the security-erase algorithm and the erase decrypting key are set at the same time as the security-lock process.

The input unit 330 is for inputting commands and data to the PC. The input unit 330 includes a keyboard and a mouse.

The display unit 340 is for displaying data processed by the PC. The display unit 340 includes a monitor.

The host interface 280 is for receiving/transmitting the commands and data between the PC, that is, the host device, and the hard disk drive 10, that is, the data storage system.

The PC controller 310 generally controls the hard disk drive 10. In particular, the PC controller 310 serves as a master controller of the hard disk drive 10 connected thereto. The PC controller 310 performs a control process for setting the security-erase algorithm and associated key at the time of setting the security-lock process.

Figure 4:
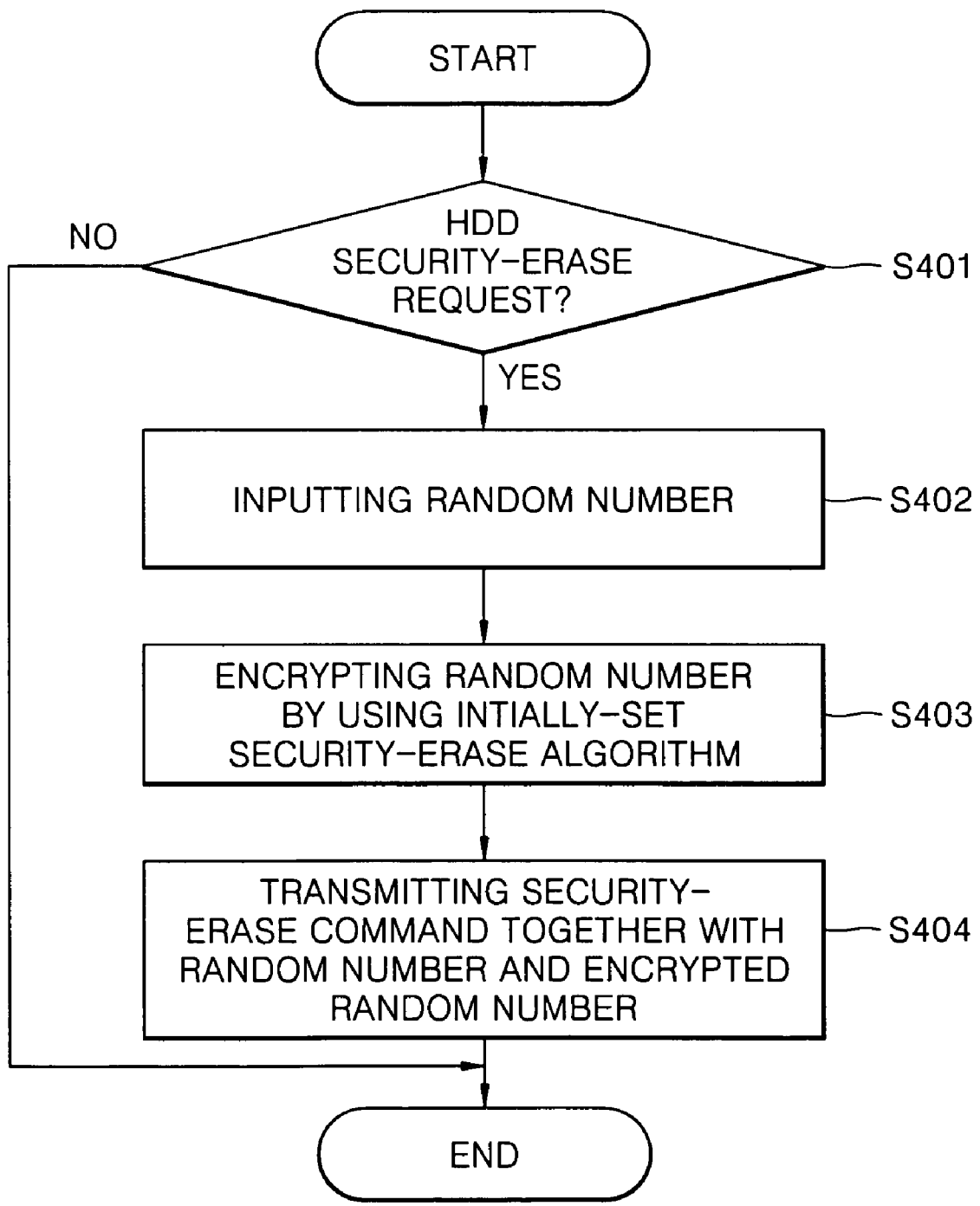
FIG. 4 is a flowchart illustrating the operations of generating a security-erase command and transmitting the security-erase command from the host system to the hard disk drive according to an embodiment of the present invention.

Now, a process for transmitting the security-erase command from the host device to the hard disk drive 10 under the control of the PC controller 310 will be described with reference to FIGS. 3 and 4.

Firstly, the PC controller 310 determines whether or not a hard disk drive (HDD) security-erase request is received though the input unit 330 (S401).

Next, as a result of operation S401, if the HDD security-erase request is received, an input window is displayed on the display unit 340 in order to input a random number. Next, a user inputs the random number into the input window (S402).

In response to the input random number, the PC controller 310 encrypts the input random number by using the security-erase algorithm and the erase decrypting key stored in the PC memory 320 (S403).

Next, the PC controller 310 transmits a security-erase command together with the random number input by the user and the encrypted random number to the hard disk drive 10 via the host interface 280 (S404).

Figure 5:
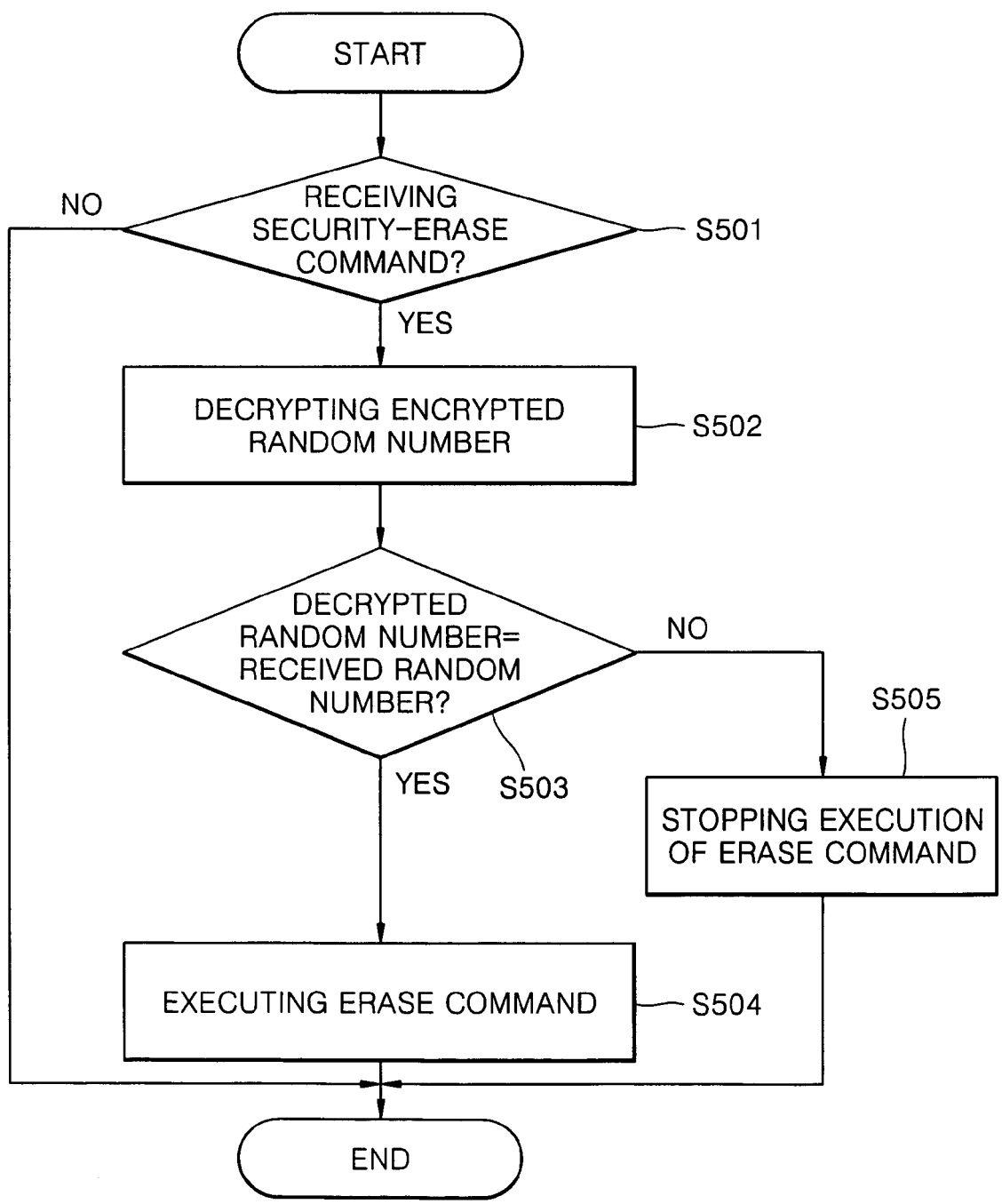
FIG. 5 is a flowchart illustrating the operation of securely erasing data in the hard disk drive according to an embodiment of the present invention.

Now, the security-erase process executed by the hard disk drive 10 will be described with reference to a flowchart of FIG. 5 and the block diagram of FIG. 2.

Firstly, the controller 240 determines whether or not the security-erase command is received from the host device (S501). The security-erase command is transmitted together with the random number input by the user and the encrypted random number.

As a result of operation S501, if the security-erase command is received, the controller 240 reads the security-erase algorithm and the erase decrypting key from the magnetic disk 12 and decrypts the encrypted random number received together with the security-erase command (S502).

Next, the controller 240 determines whether or not the decrypted random number in operation S502 is identical to the random number received together with the security-erase command in operation S501 (S503).

As a result of operation S503, if the decrypted random number is identical to the random number received together with the security-erase command, the controller 240 executes an erase command (S504). If not, the controller 240 stops the execution of the erase command (S505).

Therefore, only the host device that locks the hard disk drive can erase data from the magnetic disk 12 of the hard disk drive 10, so that it is possible to securely erase the data while preventing data leakage.

According to the above-described embodiment of the present invention, a security algorithm and an associated key used for a security-erase process is set to be different from a security algorithm and an associated key used for a security-lock process at the time of setting the security-lock process, and a security-erase command is transmitted to a data storage device while the keys used for the security algorithms are prevented from leakage. Therefore, only the host system that locks a data recording medium can securely erase data recorded on the storage medium. In addition, since the keys used for the security algorithm are prevented from leaking, it is possible to protect data securely. Since the security-erase algorithm and associated key are set to be different from a security algorithm and an associated key used for a lock process for limiting a data access, it is possible to more securely protect data recorded on a storage medium.

The above-described embodiment of the present invention may be implemented as a method, apparatus, system, etc. When implemented in software, elements of the present invention are essentially code segments to perform necessary tasks. The code segments or a program can be stored in a processor readable medium or transmitted as computer data signals coupled to a carrier wave through a communication medium or network. The processor readable medium includes any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, an optical fiber medium, an RF network, etc. Examples of the computer data signals include any signals that can be transmitted through a transmission medium such as an electronic network channel, an optical fiber, air, an electromagnetic network, and an RF network.

Although an embodiment of the present invention has been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A method of securely erasing data stored in a data storage system, comprising:
    determining whether a security-erase command is received together with a random number and an encrypted random number;
    decrypting the encrypted random number using a security-erase algorithm and an erase decryption key when the security-erase command is received;
    determining whether the decrypted random number is identical to the received random number; and
    executing the security-erase command to securely erase recorded data on the data storage system when the decrypted random number is identical to the received random number, and stopping the execution of the security-erase command when the decrypted random number is not identical to the received random number.

2. The method according to claim 1, wherein the security-erase algorithm and associated key are set to be different from a security algorithm and an associated key used for a lock process for limiting access to data.

3. The method according to claim 1, wherein the security-erase algorithm and associated key are set at the same time as a setting of a security-lock process for limiting access to data.

4. A computer-readable storage medium encoded with processing instructions for causing a processor to execute a method of securely erasing data stored in a data storage system, the method comprising:
    determining whether a security-erase command is received together with a random number and an encrypted random number;
    decrypting the encrypted random number using a security-erase algorithm and an erase decryption key when the security-erase command is received;
    determining whether the decrypted random number is identical to the received random number; and
    executing the security-erase command to securely erase recorded data on the data storage system when the decrypted random number is identical to the received random number, and stopping the execution of the security-erase command when the decrypted random number is not identical to the received random number.

5. The computer-readable storage medium of claim 4, wherein the predetermined security algorithm and associated key are different from a security algorithm and an associated key used for a lock process for limiting access to data.

6. The computer program product according to claim 4, wherein the security-erase algorithm and associated key are set at the same time as setting a security-lock process for limiting access to data.

7. The hard disk drive according to claim 6, further comprising:
a host interface which transfers data to and/or from a host device; and
a read/write circuit unit which reads data from the disk and writes data received via the host interface and data for erasure.

8. A hard disk drive comprising:
a disk which stores in a specified region thereof a security-lock algorithm, a lock decrypting key, a security-erase algorithm, and an erase decrypting key, wherein the security-lock algorithm and the lock decrypting key are used to set a security process for limiting data access to the hard disk; and
a controller which reads the security-erase algorithm and the erase decrypting key from the disk and decrypts the encrypted random number when a security-erase command is received together with a random number and an encrypted random number from a host device, executes an erase command when the decrypted random number is identical to the random number, and stops the execution of the erase command when the decrypted random number is not identical to the random number.

9. The hard disk drive according to claim 8, wherein the predetermined region of the disk includes a maintenance cylinder region.

10. The hard disk drive according to claim 8, wherein the security-erase algorithm and associated key are set at the same time as a setting of a security-lock process for limiting access to data.

11. The hard disk drive according to claim 8, wherein the predetermined region of the disk stores a master security-erase algorithm and a master security-erase key usable for after-sale service.

12. A method of generating a security-erase command, comprising:
determining whether a hard disk drive (HDD) security-erase request is received; receiving a random number when the HDD security-erase request is received;
encrypting the input random number using a security-erase algorithm and an erase decrypting key; and
transmitting a security-erase command together with the input random number and the encrypted random number, wherein the security-erase command is used to securely erase recorded data on the data storage system when the decrypted random number is identical to the received input random number.

13. The method of claim 12, wherein the random number is received via an input window displayed on a display unit, the input window receiving a user input.

14. The method of claim 12, wherein the encrypting is performed by a PC controller.

15. The method of claim 12, wherein the transmitting is performed via a host interface and the security-erase command, the input random number, and the encrypted random number are transmitted to a hard disk drive.

16. A host device comprising:
a memory which stores a security-lock algorithm, a lock decrypting key, a security-erase algorithm, and an erase decrypting key, the security-lock algorithm and the lock decrypting key being usable to set a security-lock process for limiting data access to a hard disk drive;
a controller which generally controls the hard disk drive and performs a control process for setting the security-erase algorithm and the erase decryption key at the same time of setting the security-lock process, wherein the security-erase algorithm and the erase decrypting key are used for a security erasing process, which are set to be different from the security-lock algorithm and the lock decrypting key which are used to set a security process for limiting data access to the hard disk;
an input unit which receives commands and data to the host device;
a display unit which displays processed data; and
a host interface which transfers received commands and data between the host device and the hard disk drive.

17. The host device according to claim 16, wherein the security-erase algorithm and the erase decrypting key being set at the same time as the security-lock process.

* * * * *